(12) United States Patent
Poston (10) Patent No.: US 7,343,460 B2
(45) Date of Patent: Mar. 11, 2008

(54) DATA STORAGE SYSTEM AND PROCESS

(75) Inventor: Lloyd A. Poston, Mountain View, CA (US)

(73) Assignee: Quantum Corporation, San Jose, CA (US)

( * ) Notice: Subject to any disclaimer, the term of this patent is extended or adjusted under 35 U.S.C. 154(b) by 100 days.

(21) Appl. No.: 11/271,104

(22) Filed: Nov. 10, 2005

(65) Prior Publication Data

US 2006/0059322 A1 Mar. 16, 2006

Related U.S. Application Data

(63) Continuation of application No. 09/588,242, filed on Jun. 6, 2000.

(51) Int. Cl.
*G06F 12/06* (2006.01)
*G06F 13/00* (2006.01)

(52) U.S. Cl. .................. 711/162; 711/100; 711/154

(58) Field of Classification Search ............... 711/100, 711/154, 161, 162; 707/8, 202
See application file for complete search history.

(56) References Cited

U.S. PATENT DOCUMENTS 5,008,786 A 4/1991 Thatte (Continued)

FOREIGN PATENT DOCUMENTS

CA 2221216 A1 5/1998

(Continued)

OTHER PUBLICATIONS

Mohan, C. et al. (1993). "Algorithms for the Management of Remote Backup Data Bases for Disaster Recovery," IEEE, pp. 511-518.

(Continued)

*Primary Examiner*—Tuan V. Thai (74) *Attorney, Agent, or Firm*—Morrison & Foerster LLP (57) ABSTRACT

Computer systems may loose data when a failure occurs within a system. To counteract such loss of data a backup system may be employed. Common backup systems make a copy of either of the data on a storage device or the data, which has changed, on a storage device. The process of backing up data may involve storing a relatively large amount of data and so is commonly done infrequently, such as once per day. If a computer's data is backed up only once per day, several hours of data may be lost if a computer system fails. Embodiments of the present invention may be used to prevent this type of data loss by backing up more frequently. In order to back up more frequently less data at a time is backed up. Instead of the data undergoing a wholesale backup infrequently, embodiments of the present invention form a timed log of the storage writes performed by the computer system. The log provides a running picture of activity to the computer storage system. By preserving the log, for example storing it at a remote site through a network connection, the state of the computer can be recreated with any desired granularity, by using the log entries to recreate the state of the data within the computer system at any desired time.

19 Claims, 6 Drawing Sheets

U.S. PATENT DOCUMENTS

| | | |
|---|---|---|
| 5,086,502 A | 2/1992 | Malcolm |
| 5,403,639 A | 4/1995 | Belsan |
| 5,479,654 A | 12/1995 | Squibb |
| 5,572,672 A * | 11/1996 | Dewitt et al. .............. 714/47 |
| 5,764,903 A | 6/1998 | Yu |
| 5,819,020 A | 10/1998 | Beeler |
| 5,943,672 A | 8/1999 | Yoshida |
| 6,158,019 A | 12/2000 | Squibb |
| 6,170,063 B1 | 1/2001 | Golding |
| 6,182,198 B1 | 1/2001 | Hubis |
| 6,202,136 B1 | 3/2001 | Wikle |
| 6,205,450 B1 | 3/2001 | Kanome |
| 6,301,677 B1 | 10/2001 | Squibb |
| 6,615,253 B1 * | 9/2003 | Bowman-Amuah ......... 709/219 |
| 6,763,440 B1 * | 7/2004 | Traversat et al. ........... 711/159 |
| 6,957,237 B1 * | 10/2005 | Traversat et al. ........... 707/206 |

FOREIGN PATENT DOCUMENTS

| | | |
|---|---|---|
| WO | WO-0101251 A | 1/2001 |

OTHER PUBLICATIONS

Cheriton, D.R. et al. (1995). "Logged Virtual Memory," Operating Systems Reviews, ACM, 29(5): 26-39.

International Search Report mailed on Aug. 15, 2001 for PCT Application No. PCT/US01/18564 filed on Jun. 6, 2001.

* cited by examiner

DATA STORAGE SYSTEM AND PROCESS

CROSS REFERENCE TO RELATED APPLICATIONS

This application is a continuation application of earlier filed U.S. Ser. No. 09/588,242, entitled DATA STORAGE SYSTEM AND PROCESS, filed on Jun. 6, 2000, the entire content of which is incorporated herein by reference.

FIELD OF THE INVENTION

The present invention relates to data storage systems and, in particular embodiments, to data storage systems that provide the ability for continuous up to date backup of a computer hard disk drive.

BACKGROUND OF THE INVENTION

Since the beginning of computer systems there have been computer system failures, crashes, power outages and other conditions that result in data loss. Often when a computer system fails, the data within the computer system, which is not stored on a nonvolatile media storage device, is lost. To prevent the loss of computer data, users of computer systems have implemented a variety of schemes to protect computer data from loss. One method of preventing loss of computer data is through data backup schemes. Backup schemes, in general, protect computer data by copying data to a storage device, which can then be accessed if the original data is lost or corrupted.

Because of the proliferation of computer data, for example within a company wide network, facilities for backing up large amounts of data are relatively common. One common scheme for backing up data, for example in a network, is to take a snapshot of the data during a period of low user activity. For example, many computer systems are commonly backed up at night when few or no users are using the system. A common method of backup is to merely copy all of the data on hard disks to a mass storage media such as a tape or RAID (Redundant Array of Inexpensive Disks).

As the amount of data within a network increases, daily backups of the entire data within a system may become impractical. Most systems commonly limit the data backed up to include only those files which have been changed during the course of a day. While the method of backing up only the files that have changed can ease the backup burden, the process of restoring of the data after a catastrophic failure can require loading data from multiple sequential days. Nonetheless, network backup systems are still commonly snapshot based, that is they run periodically—commonly once per day. In large systems, in which only the changed files are backed up once per day, a full system back up is commonly performed once per week, for example, on the weekends.

There are several difficulties with these common schemes of computer system backups. A first obvious difficulty arises because, although the files are backed up once per day, a failure during the day can cause the loss of several hours of data or work product. Another difficulty can arise because, during the back up period, a large amount of network bandwidth may be consumed in transferring files to a backup system. This bandwidth usage requirement can interfere with other system functions that may be running concurrently.

Some systems have attempted to deal with the problem of losing several hours of data, which can occur if a backup is only done once per day, by increasing the frequency of backups. For example, some word processing programs may have facilities to store the open files on a timed basis. The method of storing files on a timed basis can somewhat alleviate the problem of losing many hours of data due to a catastrophic failure. The continual storing of files from many users in a network can consume a large amount of the network bandwidth, however, thereby slowing down all users. In addition to slowing down the network response time by burdening the networks with the extra backup traffic, the usable bandwidth and hence the capability and efficiency of the network is reduced.

Because of the aforementioned difficulties in current systems there is a need for efficient continuous backups that can minimize the loss of data during a catastrophic failure and yet not adversely impact the functioning of the computer system with excessive backup traffic.

SUMMARY OF THE DISCLOSURE

Accordingly, to overcome limitations in the prior art described above, and to overcome other limitations that will become apparent upon reading the present specification, preferred embodiments of the present invention relate to a system and method for enabling efficient continuous backups of mass storage within a computer system.

A preferred embodiment of the present invention provides the ability to restore data up to an arbitrary time, or up to the point that a failure occurred.

In particular, preferred embodiments of the present system provide a continuous backup capability in which, instead of storing snapshots of the system data at any particular time creates a continuous record of data changes.

In one illustrative embodiment, a system and process for enabling efficient continuous backups is based on log-assisted disk technology (LAD). One embodiment of the LAD comprises a software layer that is added to an operating system's normal disk interface. The LAD software allows extra capabilities to be added to the disk interface. A disk interface with a LAD software layer looks and acts just like a normal disk drive interface to the operating system. Its operation can also be transparent to the user.

In an exemplary LAD based system, implemented on a workstation within a computer network, data written to the LAD is also queued for transmission to a separate storage program running on a server. Data is sent to the storage server in the order in which it was written to the LAD. These ordered transmissions of data allow the storage server to maintain a complete copy of the data written to the LAD. Because the storage server maintains a complete copy of the data written to the LAD the storage server can determine for any point in time all of the data that was current as of that time. This facility allows the creation of a virtual disk image of the local workstation hard disk as it was at any particular point in time. The server then can provide complete backup coverage of all data written to the workstation disk, an improvement over a daily-snapshot system, which only captures data at the time of the snapshot. Another benefit of the LAD system is that it can serve as a backup for both inactive and active files.

In a further embodiment of a system containing LAD capability, the disk activity which is queued for transmission to the server is sent only during periods in which the traffic on the network is light. In this manner continual backup of the workstation data does not adversely impact the overall performance of the network.

BRIEF DESCRIPTION OF THE DRAWINGS

Referring now to the drawings in which consistent numbers refer to like elements throughout.

DETAILED DESCRIPTION OF PREFERRED EMBODIMENTS

In the following description, reference is made to the accompanying drawings, which form a part hereof, and in which is shown by way of illustration specific embodiments in which the invention may be practiced. It is to be understood that other embodiments may be utilized as structural changes without departing from the scope and inventive concepts of the present disclosure.

Accordingly embodiments of the present invention relate, generally, to continuous backup systems implemented on any computing platform. However, for the purposes of simplifying this disclosure, preferred embodiments are described herein with relation to backups performed for workstations connected to a network. This exemplary embodiment is chosen as an example likely to be familiar to those skilled in the art, but is not intended to limit the invention to the example embodiment. Those skilled in the art will recognize the wide applicability of the inventive aspects disclosed herein. Accordingly, the examples disclosed are intended to illustrate the inventive aspects of this disclosure, and not to limit them to a particular form or implementation.

Figure 1:
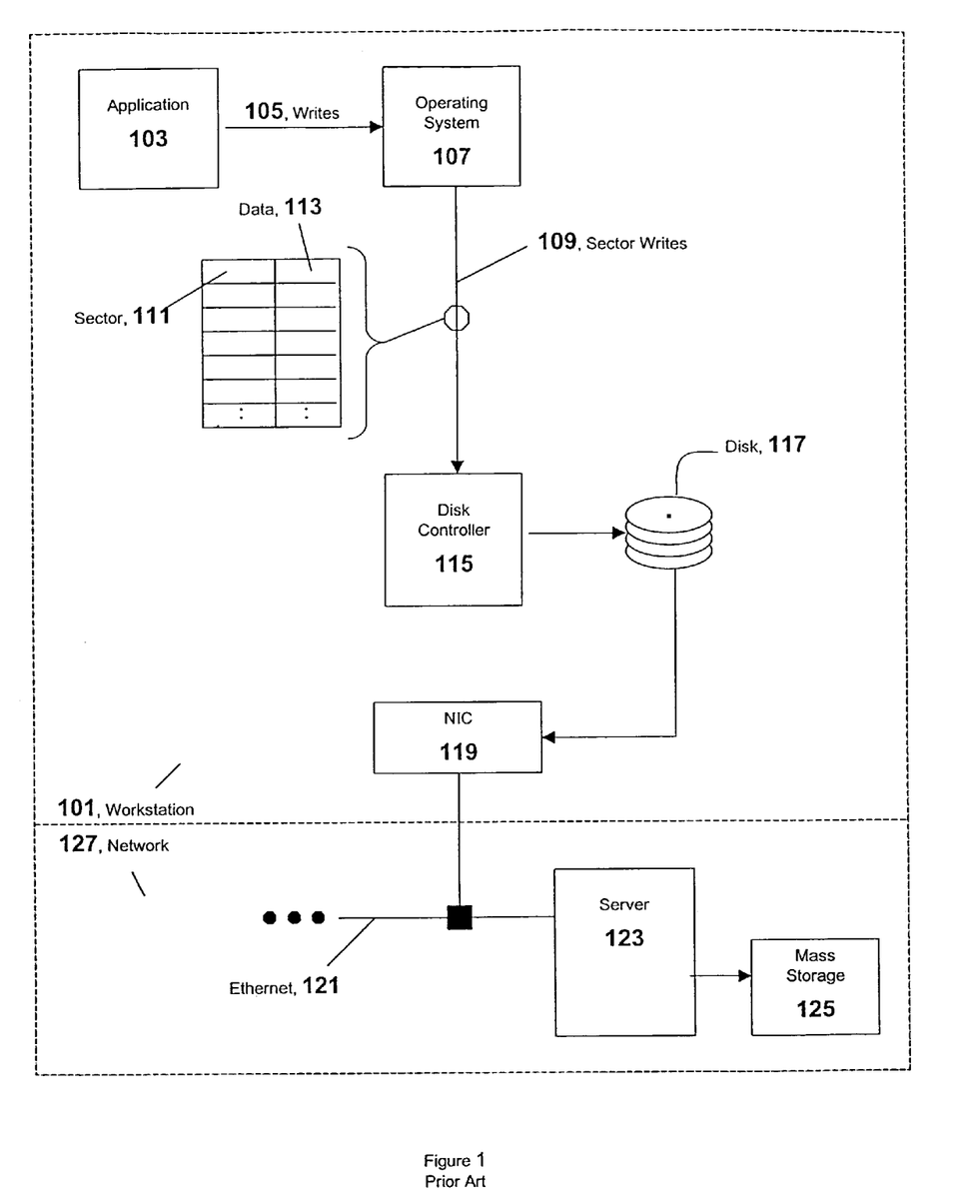
FIG. 1 is a block diagram of a prior art backup system in which a workstation is backed up using a network connection.

FIG. 1 is a block diagram illustrating an example of a prior art backup system. In FIG. 1, a workstation 101 is backed up using network 127. An application running on workstation 101 performs writes 105 that will be recorded on the mass storage device of the workstation, in the present example disk 117. The application 103 writes 105 are accepted by the operating system 107. The operating system changes the application writes into sector writes 109, each of which comprise a sector address 111 and data 113. The sector writes are communicated to a disk controller 115, which then performs the actual sector writes to the disk 117. At a designated period, for example once per day or on command, a backup is performed. The backup communicates copies of the files on disk 117, which have been changed since the last backup, to a network interface card (NIC) 119. In the present exemplary embodiment the network interface card 119 comprises an ethernet card. The card is connected to an ethernet cable 121, which is then further connected to a server 123. The server receives the communications from the network interface card 119 across the ethernet 121 and writes the communications to the mass storage 125. In this way any files that are changed on disk 117 during a particular day will be copied to the mass storage 125, to preserve them in case of catastrophic failure within the workstation.

Figure 2:
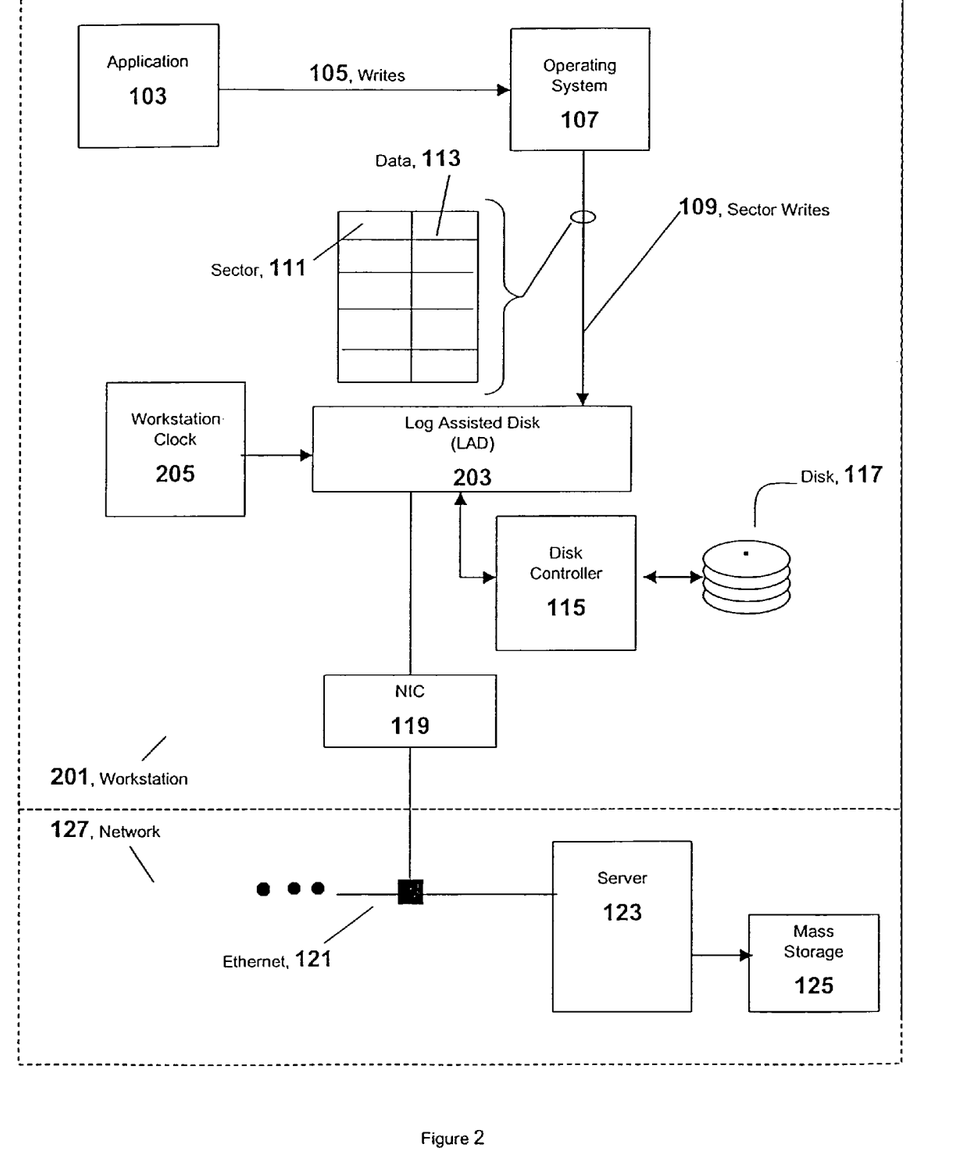
FIG. 2 is a block diagram according to an embodiment of the invention in which a workstation is backed up using a network connection.

FIG. 2 represents a workstation according to one embodiment of the present invention. The workstation 201 runs an application 103, which proceeds to issue application writes 105, as described above. The writes 105 are accepted by an operating system 107 and converted into sector writes 109. The sector writes each comprise a sector address 111 and sector data 113. In the present example items 103 through 113, in the illustrative embodiments of FIG. 2, may be identical to the similarly numbered items in FIG. 1, the prior art system.

Sector writes 109 are communicated to a log-assisted disk LAD 203. The log-assisted disk system 203 accumulates the sector writes 109 and time stamps sector writes with a workstation clock 205 time. At predetermined times, which may be when a log assisted disk queue is nearly full, at pre-determined time intervals, or when there is minimal traffic on the network, the new data structure comprising the sector writes 109 which have been time stamped by the workstation clock 205 are provided to the network interface card 119. The network interface card 119, illustratively an Ethernet card, couples the sector writes time stamped by the workstation clock into the Ethernet 121 and further to the server 123 then to a mass storage 125.

In the present example, however, instead of mass storage containing changed files the mass storage contains a log of the sector writes to the disk. The sector writes also have been time stamped by the workstation clock 205 so that the time when each was generated by the operating system is known. Additionally, since the log assisted disk system may write to a mass storage through the network many times per day, for example during periods in which the network traffic is low, the need for a fixed backup period can be eliminated.

In a further embodiment, the LAD 203 may be controlled to write to mass storage 125 through the network 127 as the writes occur. In this manner, if a catastrophic event should befall the workstation 201, minimal or no data is lost because all writes are effectively being continuously recorded in the mass storage 125.

An additional advantage provided over the periodic backup is that the original system data can be recreated with a fine granularity. This means that the most data which can be lost is that waiting to be written to the network from the LAD. The latency period between writes of the log assisted disk system 203 to the mass storage of the network 125 may be made as short as desired. If the period were made to equal five minutes then the most data that a catastrophic failure at the workstation 201 could cause would be the data that had occurred in writes of five minutes since the last log assisted disk transmission.

Additionally, since the mass storage contains a log of events on, as opposed to a simple recording of the last updated version of each file, the workstation disk 117 can be re-created up to any given time within the log. The ability to recreate the workstation disk can be very useful if an application for example were to cause a catastrophic failure at the workstation 201. The writes of the application could then be traced through the log-assisted disk and a new disk could be created that mirrored the old workstation disk 117. The new disk record could be recreated up to any point in time within the log, including the point for example when the application causing the catastrophic failure was initiated. Because the disk can be recreated as it existed at any time up until the failure the backup system provides great flexibility.

Figure 3:
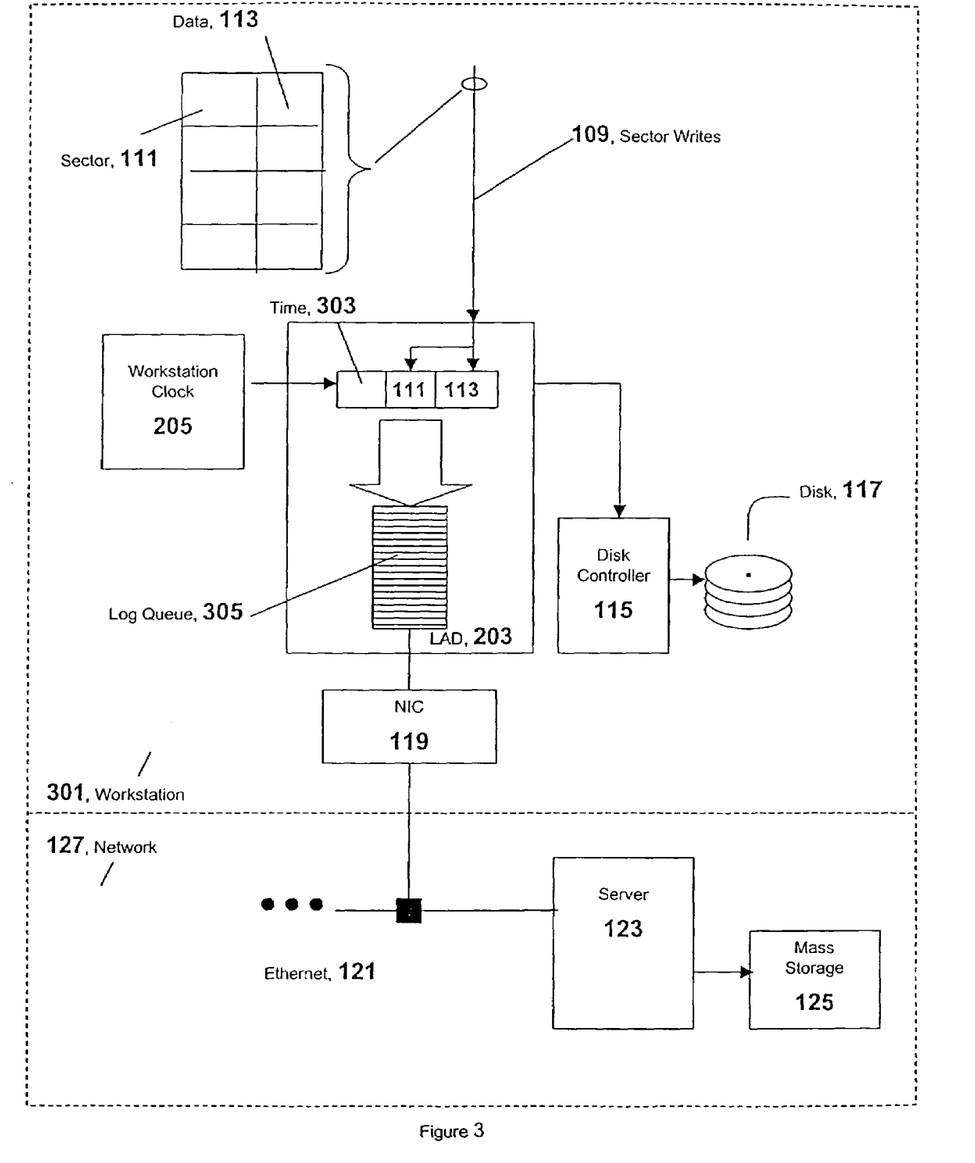
FIG. 3 is a block diagram according to an embodiment of the invention in which the function of a log-assisted disk is illustrated.

FIG. 3 is a more detailed description of the operation of a log-assisted disk system according to an example embodiment of the invention. Sector writes 109 containing a sector address 111 and sector data 113 are communicated to the log-assisted disk (LAD) 203. The sector writes 109 are also communicated from the LAD to a disk controller 115, as needed for recording on the workstation disk 117. The sector writes 109 are also time stamped 303 by the workstation clock 205, or other source of time information, and then passed into the log assisted disk queue 305. The log queue 305 queues the sector writes along with their time stamp until such time as they are to be written to the network. When it is time for the LAD queue to be written to the network, the queue is communicated to the network interface card 119, in the illustrated example an ethernet card, and then to the ethernet 121 and further to server 123 and the mass storage unit 125.

Figure 4:
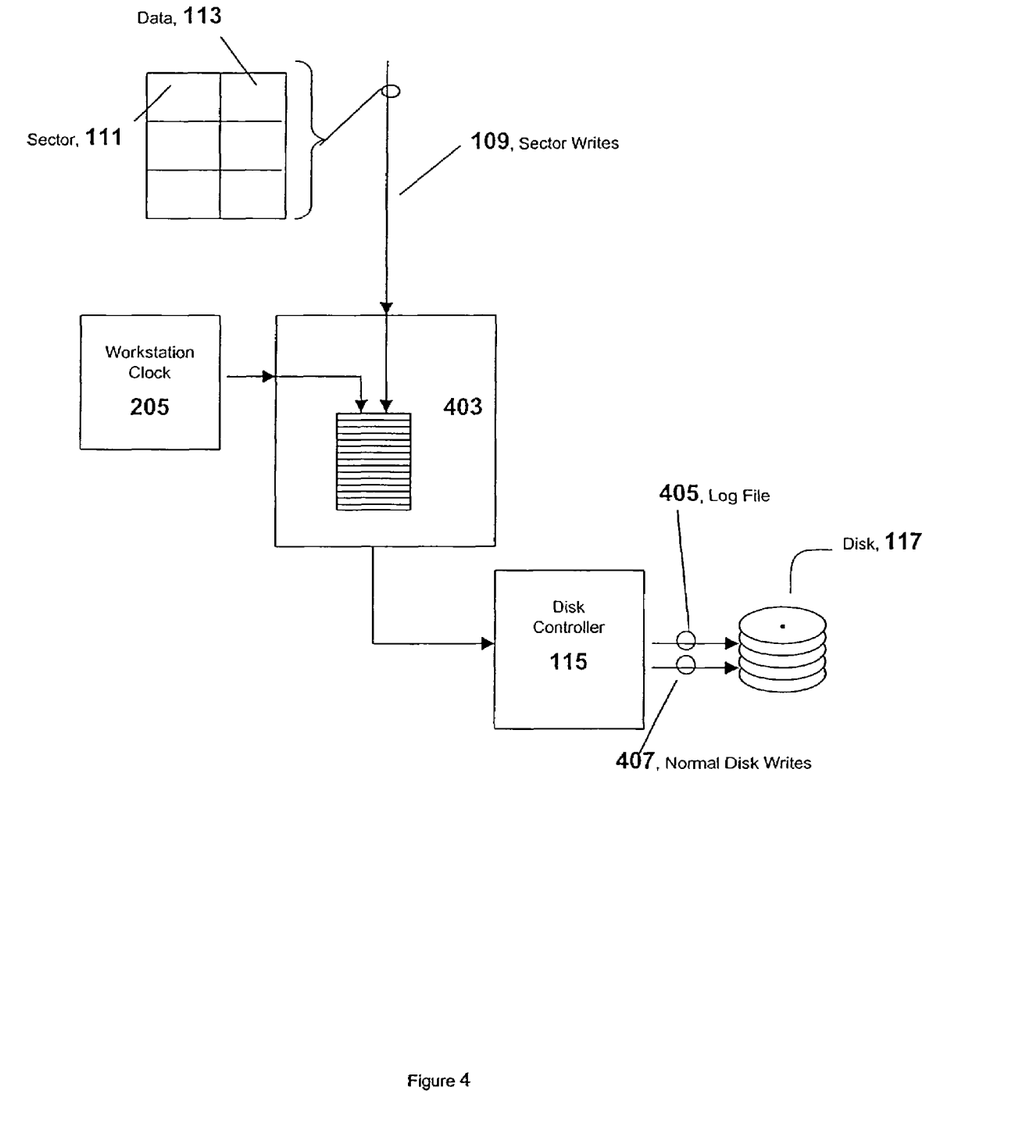
FIG. 4 is an exemplary embodiment of the invention implemented on a single workstation.

FIG. 4 is an example of a backup system within a workstation according to a further embodiment of the invention. As in the previous FIGS. 1, 2 and 3, sector writes 109 containing sector addresses 111 and data 113 are accepted by the log-assisted disk system 403. The sector writes are then provided by the log-assisted disk system 403 to the disk controller 115, which writes the sector addresses and data to the disk 117 utilizing normal disk writes 407. In addition, the sector writes are time stamped by workstation clock 205 and are queued within the log assisted disk 403 so as not to interfere with the normal disk writes 407. The time stamped sector writes are then written into a log file 405 and onto disk 117 by the disk controller 115. Other embodiments, instead of using a workstation clock, may use other sources of time. Time may come from a network clock, an independent time source—such as one synchronized to a particular time standard, or a variety of other sources.

In a multi-disk system, the log file 405 may be written to a second physical disk that is different from the disk being used to record normal disk writes 407. If the first disk to which the normal disk writes 407 were occurring fails, the log file on the second disk could be used to recreate the state of the first disk prior to the failure of the first disk.

Utilizing this system of two disks, one containing a LAD system, also provides a sophisticated "undo" capability. So, for example, if an operator of the workstation decided that they needed to undo several hours of work they could use the log file to recreate the state of the disk as it was several hours previously. In addition, the log file 405 would be generating, in effect, a continuous backup of the normal disk writes 407. The examples of storage devices herein are illustrated herein with respect to hard disk drives. Those skilled in the art will recognize that any storage medium or device can be used with the inventive techniques disclosed herein. The hard disk has been chosen as the illustrative device only because it is an example likely to be familiar to those skilled in the art because of its widespread popularity. No limitations on the inventive techniques should be inferred because a hard disk has been chosen as the illustrative memory device. Devices such as removable media, tape, writable CD-ROMs, WORM (Write Once Read Many) flash memory, EEPROM (Electrically Erasable Programmable Read Only Memory) as well as other storage devices may be used. The inventive techniques disclosed herein are applicable to storage devices, combinations of storage devices and systems in general.

Figure 5:
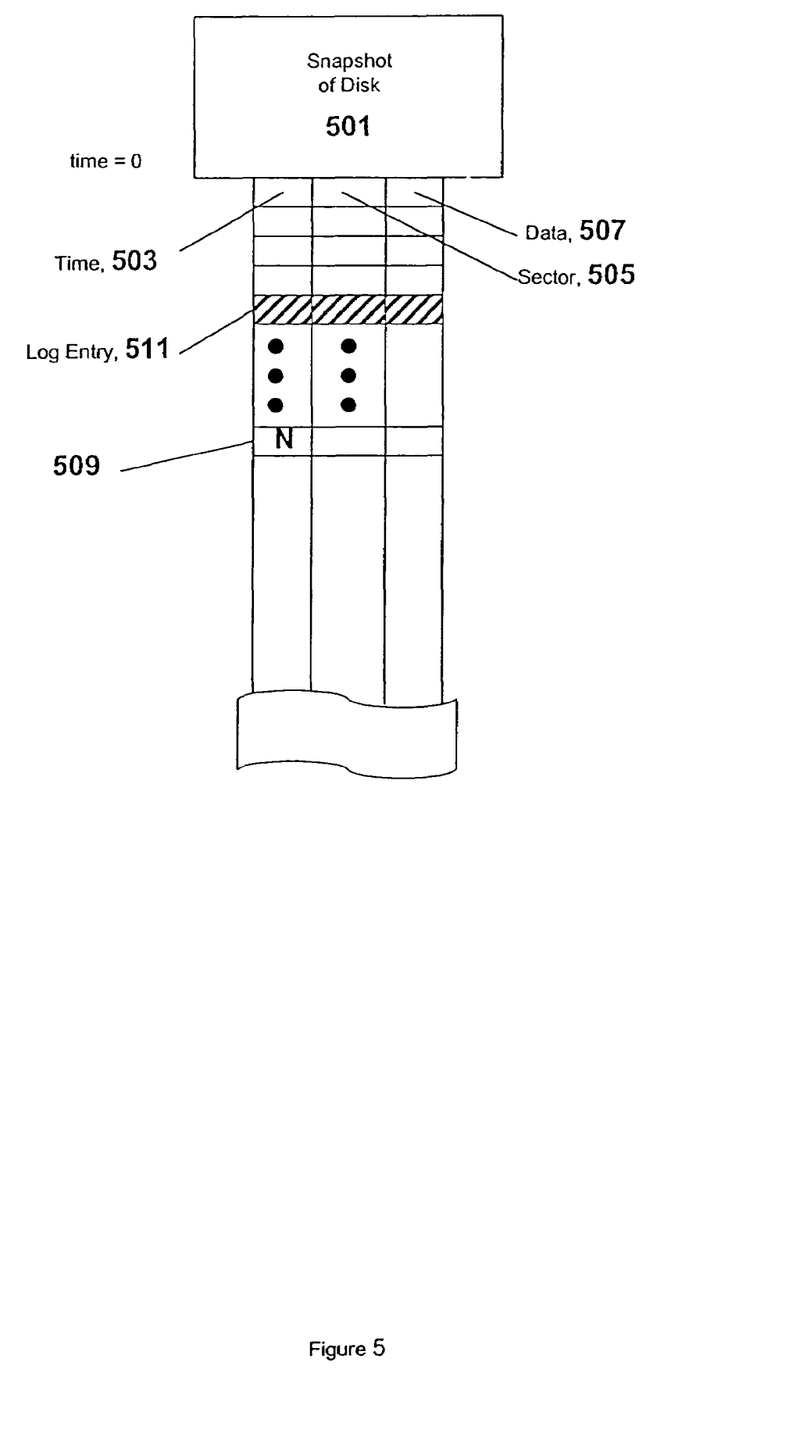
FIG. 5 is an illustration of data structures used to implement a log-assisted disk based system (LAD) according to an embodiment of the invention.

FIG. 5 is an illustration of example log assisted disk data structures. Since the log-assisted disk system is, effectively, a change record, it must have a point in time with which to reference the change. Ideally, the log-assisted disk is started when the hard disk drive is first put into use and therefore any intermediate state of the hard disk may be recreated upon a failure. If the hard disk is already in use, a snapshot of the disk 501 can be taken, for example, as part of the initial operation of the log assisted disk system. A snapshot of the disk is a copy of all the written sectors of the disk. The snapshot of the disk is set to correspond, for example, to time zero and copied onto a backup unit, such as the mass storage unit 125. Once the snapshot of the disk has been stored on the mass storage 125, the log assisted disk system has ascertained a beginning point and can record any subsequent change to the snapshot image. Changes comprise the time of the sector writes, the actual sector being written, and the sector data 507. The disk can be then recreated to a time end 509 by taking the snapshot of the disk 501 and performing the data writes 507 to the sectors 505 that exist between time zero and time N. Of course any intermediate state of the disk within the log can also be recreated. Alternatively a particular write can be ascertained.

The log assisted disk system may also be used to ascertain various metrics regarding the changes in a computer system. For example, a computer system controlling a process or recording data events could use a Log Assisted Disk in order to determine the time at which events happened, periodic activity in a system, profiles of and volume of events within a system. In essence the history of activity in a system would be captured and that history could be mined for any inherent data present within that history of activity.

Figure 6:
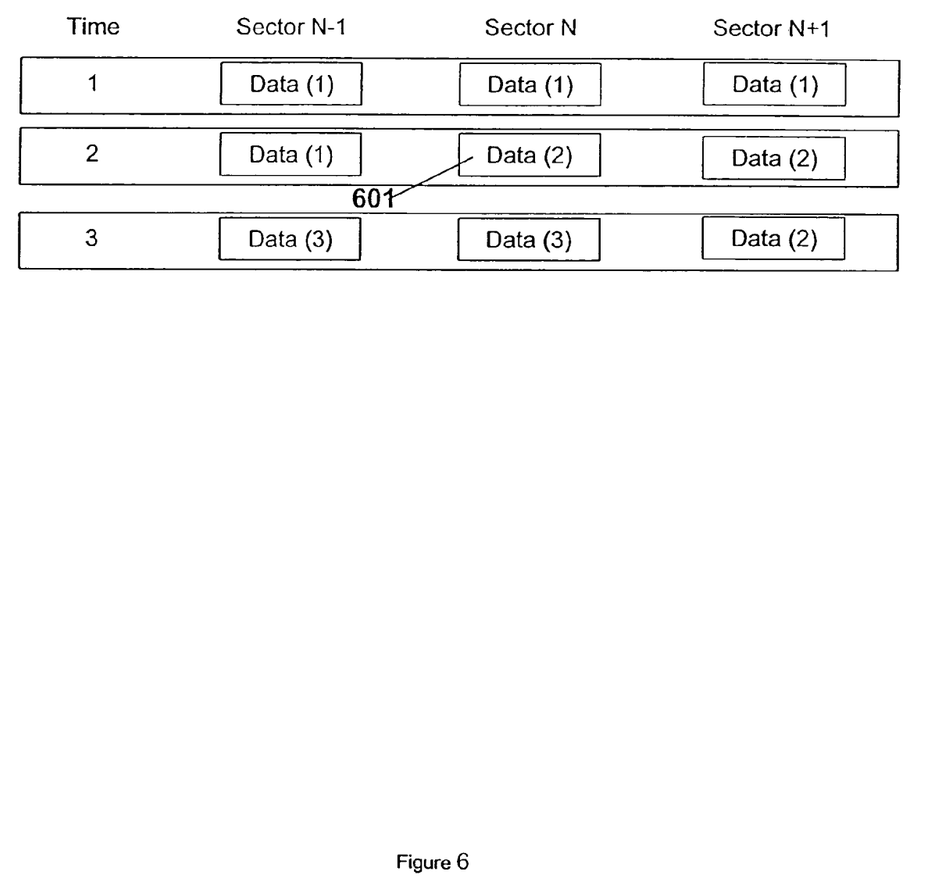
FIG. 6 is a graphical representation of a portion of the data structures of a log assisted disk system according to embodiments of the invention in which the log assisted disk construct is further used to increase the efficiency of disk accesses.

FIG. 6 is an illustration of an operation of a log assisted disk system to produce a backup with a minimum of sector writes. At time one in FIG. 6, sector (N−1) and (N+1) are displayed. At time one the data of sector (N−1) has data(1), the data of sector N has data(1) and the data of sector (N+1) has data(1). At time two, sector N has data(2) and sector (N+1) has data(2) written to it. At time three, data(3) is written into sector (N−1), data(3) is written into sector N and nothing is written into sector (N+1) so data(2) still exists within sector (N+1). As can be seen from the illustration in FIG. 6, by implementing a smart log assisted disk, data(2) in sector N, i.e. 601, need never be written to the backup. This is because sector N started with data(1), had data(2) written to it and then was overwritten by data(3). Therefore, data(2), i.e. 601, is only an intermediate state of the disk to be destroyed by a future write in normal disk operations.

By maintaining a smart sector map such as illustrated in FIG. 6, intermediate values of the sectors need not be written as a backup. Only final values of a sector during any time period need be written as a backup. This of course would eliminate the ability to recreate a data disk at any point in time. However, in networks with heavy traffic this embodiment might be an acceptable compromise in order to minimize network traffic. If the smart disk technology were applied only between successive writes of the LAD system to the network, then at most the data that could be lost would be data in the time between successive LAD system writes to the network backup system. This period could be limited to a short period of minutes or even seconds.

Many operating systems control sector writes to blocks of a hard disk using various types of algorithms. For example, storage blocks might be arranged into a queue and the least recently used block used by the operating system. Such operating system embodiments of log assisted disks might be changed so that the most recently used blocks of a hard disk are reused whenever possible. By placing the emphasis of reusing blocks in a hard disk system, a smart log assisted disk can eliminate a larger number of sector writes and thereby further minimize the network traffic necessary to backup a system using a log assisted disk. A log-assisted disk system can provide a flexibility within computer systems that was previously unknown in backup systems.

A log-assisted disk system could also be used for creating parallel or mirror sites at different locations. Using a log assisted disk system, data could be posted, for example, as it occurred, to a number of sites that were interested in the same data. Each remotely computed site would then have a hard disk copy of the data that was used to create the initial site. And applications such as remote databases could be continuously kept up to date while, in effect, providing a backup for the original data disk.

The Log Assisted Disk system can provide backup for personal computers as well as workstations connected to a network, as for example shown in FIG. 3. The network interface card 119 coupled to an ethernet connection is merely one example of interconnection that the LAD system might employ.

The NIC could also provide connection via a phone line, digital subscriber line (DSL), cable modem, or other connection to the Internet. The Internet can then provide the connection through a server 123 connected to the Internet to a remote mass storage 125.

Additionally the NIC 119 need not even connect to a network. The NIC 119 can, for example, connect via a phone line or dedicated line to a remote backup facility designed to accept log entries and return log entries on request.

Additionally log entries could be written directly to a local mass storage device, such as a tape drive, without any network connection of any type required.

The foregoing descriptions of exemplary embodiments of the present disclosure have been presented for the purpose of illustration and description. It is not intended to be exhaustive nor to limit the inventive concepts to the embodiments disclosed. Many modifications and variations are possible in light of the above teaching. It is intended that the scope of the invention be limited not within this detailed description, but rather by the claims appended hereto, which appear below.

What is claimed is:

1. An apparatus for producing a mass storage backup, the apparatus comprising:
    an operating system configured to receive write commands from an application and convert the write commands to mass storage write commands, said write storage write commands comprising data and a mass storage address at which the data is to be written;
    a source of time information;
    a circuit element configured to receive a mass storage write command from the operating system and combine the received mass storage write command with the time information to create a log entry, wherein the time information indicates when the mass storage write command was received by the circuit element; and
    a storage to accept log entries from the circuit element, wherein the circuit element queues log entries and periodically sends one or more of the queued log entries to the storage.

2. An apparatus as in claim 1 wherein the storage to accept the log entries further comprises:
    a network connection to accept the log entries and to send the log entries into a network; and
    a server to accept log entries from the network and to provide the log entries to a log file on a log file mass storage device.

3. An apparatus as in claim 1 wherein the network is the Internet.

4. An apparatus as in claim 1 wherein the mass storage address at which the data is to be written comprises a sector address.

5. An apparatus as in claim 1 wherein the storage to accept log entries is the mass storage.

6. An apparatus as in claim 1 wherein the mass storage is a hard disk system.

7. An apparatus as in claim 1 wherein the storage to accept log entries is a RAM based virtual disk.

8. A backup system for enabling continuous backup of computer data stored at a computer to a mass storage system, said backup system comprising:
    a) an operating system to receive write commands from an application installed on the computer and to convert each received write command into a sector write having a sector address and sector data;
    b) a source of time information;
    c) a log-assisted disk to process sector writes sent to the log-assisted disk by the operating system, wherein the log-assisted disk is configured to receive the sector writes, accumulate the sector writes, and combine each sector write with the time information to create a log entry;
    d) a storage to accept log entries; and
    e) a network interface card configured to send the log entry to the storage, wherein the operating system, the source of time information, the log-assisted disk, and the network interface card are in electrical communication with each other within a computer.

9. The backup system of claim 8 wherein the storage to accept log entries is located within the computer.

10. The backup system of claim 8 wherein the storage to accept log entries is in network communication with the computer.

11. The backup system of claim 10 wherein the storage to accept log entries receives log entries from multiple computers in a network.

12. The backup system of claim 10 wherein the network is the Internet.

13. The backup system of claim 8 wherein the storage to accept log entries further comprises:
    a) a network connection to accept the log entries and to send the log entries into a network; and
    b) a server to accept log entries from the network and to provide the log entries to a log file an a log file mass storage device.

14. The backup system of claim 13 wherein the mass storage device is a hard disk system.

15. The backup system of claim 13 wherein the mass storage device is a non-volatile storage.

16. The backup system of claim 8 wherein the storage to accept log entries is a hard disk system.

17. The backup system of claim 8 wherein the storage to accept log entries is a RAM-based virtual disk.

18. The backup system of claim 8 wherein the storage to accept log entries is a non-volatile storage.

19. A method of backing up a mass storage, the method comprising:

receiving a mass storage write command for the mass storage to be backed up;

combining the received mass storage write command with time information to create a log entry, wherein the time information indicate when the mass storage write command was received;

queuing the log entry in a log queue having a plurality of log entries; and periodically writing one or more log entries from the log queue into a local mass storage different from the mass storage to be backed up.

* * * * *